No. 729,812. PATENTED JUNE 2, 1903.
M. O. TROY.
SYSTEM OF ELECTRICAL DISTRIBUTION.
APPLICATION FILED DEC. 5, 1902.
NO MODEL.

Witnesses.

Inventor.
Matthew O. Troy.
by Albert G. Davis
Att'y.

No. 729,812.

Patented June 2, 1903.

UNITED STATES PATENT OFFICE.

MATTHEW O. TROY, OF SCHENECTADY, NEW YORK, ASSIGNOR TO GENERAL ELECTRIC COMPANY, A CORPORATION OF NEW YORK.

SYSTEM OF ELECTRICAL DISTRIBUTION.

SPECIFICATION forming part of Letters Patent No. 729,812, dated June 2, 1903.

Application filed December 5, 1902. Serial No. 133,964. (No model.)

*To all whom it may concern:*

Be it known that I, MATTHEW O. TROY, a citizen of the United States, residing at Schenectady, county of Schenectady, State of New York, have invented certain new and useful Improvements in Systems of Electrical Distribution, of which the following is a specification.

My invention relates to electric-distribution systems embodying constant-current transformers or constant-current reactive coils for deriving currents of constant value from a source of electric supply of constant potential, and comprises certain improvements whereby the efficiency and power factor of such a system may be improved, the means employed for this purpose being such that apparatus of the character mentioned, designed for one particular frequency, may, when desired, be operated at a different frequency. This latter possibility may be of considerable value in cases where, for example, an electric generating-station producing alternating current, say, at a frequency of one hundred and twenty-five cycles is to be changed at some subsequent time so as to generate current at a lower frequency, such as sixty cycles.

In carrying my invention into practice I connect a condenser of suitable capacity or some other device possessing the effect of capacity in series in the constant-current circuit. This condenser or other device possessing capacity being traversed by current of constant value interposes in the circuit a reactive electromotive force of constant value which operates to neutralize a certain portion of the inductance always present in the constant-current transformer or reactive coil by which the constant-current circuit is regulated. A certain amount of inductance, however, of course remains, and this has the effect of damping out harmonics in the condenser-circuit, thus preventing the condenser from accentuating these harmonics, and so interfering with the improvement in the power factor of the system due to the neutralization of waves of lagging current of normal frequency.

My invention also involves other features in the operation of a system such as described, all of which will be set forth in detail in the following description, which is to be taken in connection with the accompanying drawings, in which—

Figure 1:
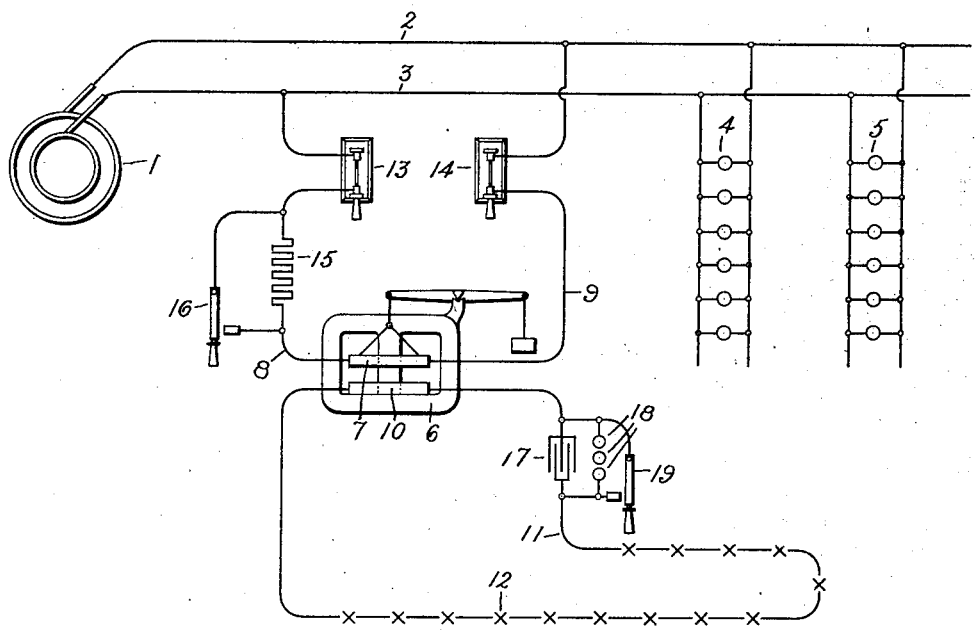
Figure 2:
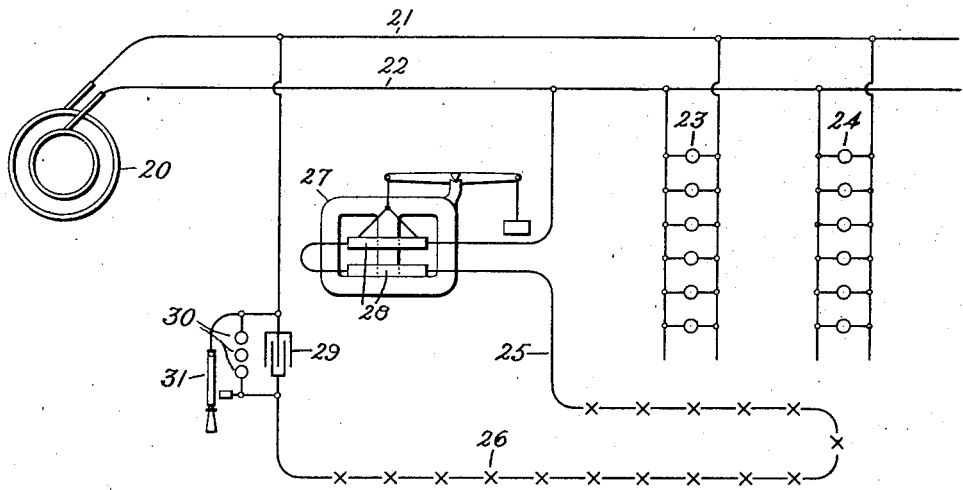

Figure 1 represents a constant-current-transformer system embodying my invention, and Fig. 2 represents my invention as utilized in connection with a constant-current reactive-coil system.

In Fig. 1 a source of current of constant potential is indicated at 1, and from this source extend mains 2 and 3, by which current may be conveyed to any desired translating devices—such, for example, as banks of lamps, (indicated at 4 and 5.) A constant-current transformer 6, of usual and well-known construction, has its primary winding 7 connected across the mains 2 3 by means of leads 8 9 and its secondary winding 10 connected to a series-distribution system 11, including arc-lamps, (represented by crosses at 12,) or any other suitable translating devices adapted to operate in series.

Plug-switches 13 14 serve to make and break connection between the primary leads 8 9 of the transformer and the supply-mains 2 3. In series with one of these leads—as, for example, the lead 8—there is connected a non-inductive resistance 15, arranged to be short-circuited when desired by means of a short-circuiting switch 16. In throwing the transformer into connection with the supply-mains 2 3 this short-circuiting switch is left open, whereby the resistance 15 thus in circuit prevents an undue rush of current and the consequent strain both on the supply system and upon the translating devices in the series consumption-circuit. The sudden rush of current which would otherwise take place at starting would unnecessarily strain the arc-lamps or other devices in the constant-current circuit, the resistance of which circuit at starting before the arcs of the lamps have been struck is so low that there practically exists a short-circuit. The instantaneous rush of current which takes place at starting before the constant-current transformer has had an opportunity to adjust itself to the conditions of working is prevented by the use of the resistance 15, which resistance is cut out by means of the short-circuiting switch as soon as the apparatus has gotten into steady working condition. Hitherto it has been found necessary to employ more or less complicated electromechanical devices for holding and for releasing the relatively movable coils of the constant-current transformer or to perform the same results by hand. These objections are obviated by the use of the means described. Instead of using separate switches 13 and 16 I may use a single switch having contacts for first closing the circuit through the resistance and then short circuiting the same, or vice versa.

The condenser in the series circuit 11 is indicated at 17 and its capacity is so chosen that when the load or number of translating devices in the constant-current circuit is at or near zero the inductance of the transformer, which remains unneutralized under these conditions, is low enough to keep the current in the constant-current circuit up to its normal value. Instead of placing the condenser directly in series in the constant-current circuit it is evident that I may place it in series with the secondary of a transformer, the primary of which is instead connected in the constant-current circuit. With a step-up transformer impressing a higher voltage upon the condenser than that existing between the terminals of the primary I can by this means secure the same effect with a smaller condenser, as is well understood in the art. I may of course employ any other suitable means for neutralizing a fixed portion of the inductance of the system.

In starting up or shutting down a system such as described and also due to accidental causes it may happen that momentarily a large electromotive force may exist at the terminals of the condenser sufficient to endanger the insulation of the same, to provide against which I may employ a spark gap or gaps formed by a series of two or more spark-gap terminals 18, connected across the terminals of the condenser, as shown. It may be desirable when starting or shutting down the apparatus to have the condenser 17 out of circuit, thus increasing the reactance of the system, and so decreasing the violence of current changes, for which purpose I may employ a short-circuiting switch 19; but such a switch is, however, not absolutely necessary.

My invention is not limited to use in connection with constant-current transformers, but may be utilized in connection with constant-current reactive coils, as indicated in Fig. 2, in which, as before, a source of constant-potential alternating current is indicated at 20 and distributing-mains extending therefrom at 21 and 22, by which current is conveyed to suitable translating devices, such as banks of lamps 23 and 24 or the like. A constant-current circuit 25, including series translating devices, such as lamps, (represented conventionally by crosses 26,) is connected across the mains 21 and 22. The current in this circuit is maintained constant by means of a constant-current reactive coil 27, of a usual construction, having relatively movable coils 28 in series with each other in the constant-current circuit. The use of any other constant-current-regulating device is, however, within the scope of my invention. As is the case with the constant-current transformer in Fig. 1, increase of current in the constant-current circuit causes the relatively movable coils of the constant-current reactive coil to separate, thereby increasing the inductance of the device and bringing back the current to its normal value. As the operation of constant-current reactive coils or transformers is well understood in the art, it is believed that no further description of the same is necessary.

Like the arrangement shown in Fig. 1, the constant-current circuit in Fig. 2 has included therein and for the same purpose a condenser 29, this condenser being provided with protecting spark-gaps 30 for preventing a too-high voltage across the terminals of the condenser and is also provided with a short-circuiting switch 31. The operation of the arrangement thus described is substantially the same as the operation of the arrangement shown in Fig. 1. It is only necessary to remark that in both cases the presence of the condenser in the series circuit not only increases the power factor of the supply system, but increases the efficiency as well, and has the advantage of permitting apparatus operative, say, at sixty cycles to be used successively at a higher frequency—such, for example, as one hundred and twenty-five cycles. This is an important advantage in cases where a manufacturer must be ready to supply transformers or reactive coils of various capacities and frequencies. Heretofore it has been necessary either to have a transformer or reactive coil for each frequency or to have a compromise design suitable for two frequencies. By my invention it becomes necessary only to be prepared to furnish transformers or reactive coils designed for a given frequency and to provide a condenser or condensers in cases where a higher frequency is to be used.

Like the system shown in Fig. 1, the arrangement shown in Fig. 2 may be provided with a starting-resistance corresponding to the resistance 15 and also with controlling-switches, safety-fuses, &c., common to such systems.

What I claim as new, and desire to secure by Letters Patent of the United States, is—

1. The combination of constant-potential alternating-current supply-mains, a series circuit adapted to contain a variable number of translating devices, a device of variable inductance through the instrumentality of which energy derived from said supply-mains is utilized in said series circuit in the form of an electric current of substantially constant value, and means for neutralizing a portion of the inductance of said device.

2. The combination of constant-potential alternating-current supply-mains, a series circuit adapted to contain a variable number of translating devices, means for supplying said series circuit with a constant current derived from said supply-mains, and a device possessing the effect of capacity in series in said series circuit.

3. The combination of constant-potential alternating-current supply-mains, a series circuit adapted to contain a variable number of translating devices, means for supplying said series circuit with a constant current derived from said supply-mains, a device possessing the effect of capacity in series in said series circuit, and a spark-gap having terminals connected across the terminals of said device.

4. The combination of a constant-current-regulating device, a condenser in series in the secondary circuit of said device, and a short-circuiting switch for said condenser.

5. The combination of constant-potential alternating-current mains, a constant-current transformer fed therefrom, a constant-current circuit including constant-current translating devices fed from said transformer, and a condenser in series in said constant-current circuit.

6. The combination of constant-potential alternating-current mains, a constant-current transformer connected to said mains, a constant-current circuit fed from said transformer, and means for neutralizing a portion of the inductance of said constant-current circuit.

7. The combination of constant-potential alternating-current supply-mains, a constant-current transformer having its primary winding connected thereto, a resistance or other current-reducing device connected in series with said primary winding, means for cutting said resistance or other current-reducing device out of circuit, a series consumption circuit connected to the secondary winding of said transformer, and a condenser in series with said consumption-circuit.

8. The combination of constant-potential alternating-current supply-mains, a constant-current-regulating device having relatively movable parts, a resistance or other current-reducing device connected in circuit with said device, means for cutting said resistance or other current-reducing device out of circuit, and a consumption-circuit in which the current is regulated by said device.

In witness whereof I have hereunto set my hand this 3d day of December, 1902.

MATTHEW O. TROY.

Witnesses:
EDWARD WILLIAMS, Jr.,
HELEN ORFORD.